United States Patent
Chung et al.

(10) Patent No.: US 12,488,187 B2
(45) Date of Patent: Dec. 2, 2025

(54) METHOD OF DOMAIN-ADAPTING LARGE-CAPACITY PRE-TRAINED LANGUAGE MODEL USING SEMANTIC CHUNK DYNAMIC WEIGHT MASKING

(71) Applicant: ELECTRONICS AND TELECOMMUNICATIONS RESEARCH INSTITUTE, Daejeon (KR)

(72) Inventors: Euisok Chung, Daejeon (KR); Hyun Woo Kim, Daejeon (KR); Hwajeon Song, Daejeon (KR); Jeongmin Yang, Daejeon (KR); Byunghyun Yoo, Daejeon (KR); Ran Han, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 335 days.

(21) Appl. No.: 18/471,538

(22) Filed: Sep. 21, 2023

(65) Prior Publication Data
US 2024/0202454 A1 Jun. 20, 2024

(30) Foreign Application Priority Data
Dec. 19, 2022 (KR) .................. 10-2022-0178235

(51) Int. Cl.
*G06F 40/279* (2020.01)
*G06F 40/284* (2020.01)
(Continued)

(52) U.S. Cl.
CPC ............ *G06F 40/30* (2020.01); *G06F 40/284* (2020.01)

(58) Field of Classification Search
CPC .. G06F 16/9024; G06F 40/279; G06F 40/284; G06F 40/289; G06F 40/30; G06N 3/0455; G06N 3/096
(Continued)

(56) References Cited

U.S. PATENT DOCUMENTS

| | | | | |
|---|---|---|---|---|
| 7,328,157 B1 * | 2/2008 | Chu | ................. | G10L 13/08 704/258 |
| 8,560,477 B1 * | 10/2013 | Petrov | ................. | G06N 20/00 706/46 |

(Continued)

FOREIGN PATENT DOCUMENTS

KR 20220124389 A 9/2022

OTHER PUBLICATIONS

Andreas Stolcke, "SRILM—an extensible language modeling toolkit," 7th International Conference on Spoken Language Processing [ICSLP2002], Sep. 16, 2002.
(Continued)

*Primary Examiner* — Martin Lerner
(74) *Attorney, Agent, or Firm* — Rabin & Berdo, P.C.

(57) ABSTRACT

A domain adaptation procedure, such as fine-tuning training, is required to utilize a large-capacity PLM for a specific domain. Attempts in existing research have been made to improve performance of a PLM through domain adaptor technology based on an N-gram in order to reduce errors on the basis of the results of domain text error analysis of the PLM. Proposed is a method of selecting a semantic chunk through a domain semantic chunk graph and PageRank based on the existing domain adaptor research, with an N-gram as the semantic chunk. Proposed is also a method of domain-adapting a large-capacity PLM using semantic chunk dynamic weight masking, which reflects an output value of a PLM rather than simply integrating embedding
(Continued)

values of semantic chunks, in a semantic chunk domain adaptor technology.

20 Claims, 6 Drawing Sheets

(51) Int. Cl.
*G06F 40/30* (2020.01)
*G06N 3/096* (2023.01)

(58) Field of Classification Search
USPC .......................................... 704/1, 9; 706/12
See application file for complete search history.

(56) References Cited

U.S. PATENT DOCUMENTS

| | | | | |
|---|---|---|---|---|
| 11,544,529 | B2* | 1/2023 | Ghaeini | G06N 3/088 |
| 12,086,546 | B2* | 9/2024 | Meyerzon | G06F 40/295 |
| 2015/0106076 | A1* | 4/2015 | Hieber | G06F 40/45 |
| | | | | 704/2 |
| 2018/0024968 | A1* | 1/2018 | Clinchant | G06N 3/045 |
| | | | | 706/12 |
| 2020/0117715 | A1 | 4/2020 | Lee et al. | |
| 2020/0302917 | A1 | 9/2020 | Jeong et al. | |
| 2020/0311353 | A1* | 10/2020 | Li | G06F 40/30 |
| 2020/0365145 | A1* | 11/2020 | Ryu | G10L 15/063 |
| 2021/0174003 | A1* | 6/2021 | Meng | G06F 40/284 |
| 2021/0201015 | A1* | 7/2021 | Araki | G06N 3/02 |
| 2021/0295822 | A1* | 9/2021 | Tomkins | G06F 40/30 |
| 2022/0019744 | A1 | 1/2022 | Yu et al. | |
| 2022/0382982 | A1* | 12/2022 | Orbach | G06F 40/289 |
| 2023/0130902 | A1* | 4/2023 | Saito | G06F 40/56 |
| | | | | 704/9 |

OTHER PUBLICATIONS

Lawrence Page et al., "The PageRank citation ranking: Bringing order to the web," Technical Report SIDL-WP-1999-0120, Stanford Digital Library Technologies Project, Jan. 29, 1998.
Piotr Bojanowski et al., "Enriching Word Vectors with Subword Information," arXiv:1607.04606v2, Jun. 19, 2017.
Shizhe Diao et al., "Taming Pre-trained Language Models with N-gram Representations for Low-Resource Domain Adaptation," Proceedings of the 59th Annual Meeting of the Association for Computational Linguistics and the 11th International Joint Conference of Natural Language Processing, pp. 3336-3349, Aug. 1, 2021.
Xin Liu et al., "Bridging Subword Gaps in Pretrain-Finetune Paradigm for Natural Language Generation," Proceedings of the 59th Annual Meeting of the Association for Computational Linguistics and the 11th International Joint Conference of Natural Language Processing, pp. 6001-6011, Aug. 1, 2021.

* cited by examiner

METHOD OF DOMAIN-ADAPTING LARGE-CAPACITY PRE-TRAINED LANGUAGE MODEL USING SEMANTIC CHUNK DYNAMIC WEIGHT MASKING

CROSS-REFERENCE TO RELATED APPLICATION

This application claims priority to and the benefit of Korean Patent Application No. 10-2022-0178235, filed on Dec. 19, 2022, the disclosure of which is incorporated herein by reference in its entirety.

BACKGROUND

1. Technical Field

The present disclosure relates to a method of domain-adapting a pre-trained language model.

2. Related Art

An additional procedure for achieving domain performance is required to utilize a pre-trained Language Model (PLM) for a domain-specific region. A well-known approach is continuous pre-training and fine-tuning using data on the domain-specific region. An auxiliary model that can integrate specific data on the domain-specific region is also one of the possible approaches. A problem with the continuous pre-training is that a large amount of data on the domain is required.

Regarding PLM adaptation technology, as an auxiliary model approach, a transformer-based domain-aware N-gram adaptor (T-DNA) that integrates domain N-grams has been proposed (this approach will be described below; refer to the reference document [1]) The T-DNA is an approach based on N-grams. The T-DNA has been developed based on the idea that applying the PLM to a new domain text results in a higher ratio of high-frequency domain N-grams in erroneous text than in correct text. In order to select a semantic chunk of the domain, the T-DNA uses a pointwise mutual information method that can identify collocation information of words. This method has the problem of needing to identify only amounts of information of two words and has the limitation of having difficulty in utilizing external information when only a small amount of domain data is present.

In addition, when semantic chunk information is expressed in a model, the T-DNA processes embedding values of all semantic chunks included in a sentence in the same manner. Then, the T-DNA also processes words that constitute the semantic chunk, in the same manner. In summary, the T-DNA has two limitations: it does not reflect the relative importance between semantic chunks, nor does it reflect the position-dependent characteristics of words that constitute the semantic chunk.

DOCUMENTS OF RELATED ART

Non-Patent Document (Non-patent Document 1) Shizhe Diao et al., "Taming Pre-trained Language Models with N-gram Representations for Low-Resource Domain Adaptation," in Proceedings of the 59th Annual Meeting of the Association for Computational Linguistics, 2021.
(Non-patent Document 2) Xin Liu et al., "Bridging Subword Gaps in Pretrain-Finetune Paradigm for Natural Language Generation," in Proceedings of the 59th Annual Meeting of the Association for Computational Linguistics, 2021.
(Non-patent Document 3) Lawrence Page et al., "The PageRank citation ranking: Bringing order to the web," Stanford InfoLab, 1999.
(Non-patent Document 4) Andreas Stolcke, "SRILM—an extensible language modeling toolkit," Interspeech, 2002.
(Non-patent Document 5) Piotr Bojanowski et al., "Enriching Word Vectors with Subword Information," arXiv preprint arXiv: 1607.04606, 2016.

SUMMARY

An object of the present disclosure is to provide a method of selecting a domain semantic chunk using a domain semantic chunk graph and a PageRank algorithm based on existing domain adaptor research, with an N-gram as an implementation example of a semantic chunk.

Another object of the present disclosure is to provide a method of domain-adapting a large-capacity pre-trained language model using semantic chunk dynamic weight masking, which reflects an output value of a PLM rather than simply integrating embedding values of semantic chunks, in a semantic chunk domain adaptor technology.

Still another object of the present disclosure is to ensure domain performance of a pre-trained language model through the above-mentioned method of selecting a domain semantic chunk and the above-mentioned method of domain-adapting a large-capacity pre-trained language model using a semantic chunk dynamic weight masking.

The present disclosure is not limited to the above-mentioned objects. From the subsequent detailed description, an object not mentioned above would be readily apparent to a person of ordinary skill in the art to which the present disclosure pertains.

According to an aspect of the present disclosure, there is provided a method of domain-adapting a pre-trained language model. This method is a method of domain-adapting a pre-trained language model based on a transformer. The method of domain-adapting a pre-trained language model includes: generating an encoding hidden vector sequence on the basis of an input sentence; updating the encoding hidden vector sequence on the basis of a domain semantic chunk extracted from the input sentence; generating a decoding hidden vector sequence on the basis of an output sentence and the updated encoding hidden vector sequence; updating the decoding hidden vector sequence on the basis of a domain semantic chunk extracted from the output sentence; and computing an output probability on the basis of the updated decoding hidden vector sequence.

In the method, in the updating of the encoding hidden vector sequence, the encoding hidden vector sequence may be generated by applying token separation, embedding, and self-attention on the basis of the input sentence.

In the method, in the updating of the decoding hidden vector sequence, an output embedding vector may be generated by applying token separation and embedding on the basis of the output sentence, and the decoding hidden vector sequence may be generated using cross attention and self-attention on the basis of the output embedding vector and the updated encoding hidden vector sequence.

In the method, in the updating of the encoding hidden vector sequence, an input sentence semantic chunk embedding vector may be generated on the basis of the domain semantic chunk extracted from the input sentence, an encoding semantic chunk vector may be generated by applying self-attention to the input sentence semantic chunk embedding vector, an encoding semantic chunk position matrix may be generated on the basis of a positional relationship between a token of the input sentence and the domain semantic chunk extracted from the input sentence, and the encoding hidden vector sequence may be updated on the basis of the encoding semantic chunk vector and the encoding semantic chunk position matrix.

In the method, in the updating of the encoding hidden vector sequence, an attention-based encoding semantic chunk position matrix may be generated through an attention technique by applying a value of the elementwise product of the encoding semantic chunk vector and the encoding semantic chunk position matrix, as a key of attention, and applying the encoding hidden vector sequence as a query of attention, and the encoding hidden vector sequence may be updated on the basis of the attention-based encoding semantic chunk position matrix and the encoding semantic chunk matrix.

In the method, in the updating of the decoding hidden vector sequence, an output sentence semantic chunk embedding vector may be generated on the basis of the domain semantic chunk extracted from the output sentence, a decoding semantic chunk vector may be generated by applying self-attention to the output sentence semantic chunk embedding vector, a decoding semantic chunk position matrix may be generated on the basis of a positional relationship between a token of the output sentence and the domain semantic chunk extracted from the output sentence, and the decoding hidden vector sequence may be updated on the basis of the decoding semantic chunk vector and the decoding semantic chunk position matrix.

In the method, in the updating of the decoding hidden vector sequence, an attention-based decoding semantic chunk position matrix is generated through an attention technique by applying a value of the elementwise product of the decoding semantic chunk vector and the decoding semantic chunk position matrix, as a key of attention, and applying the decoding hidden vector sequence as a query of attention, and the decoding hidden vector sequence may be updated on the basis of the attention-based decoding semantic chunk position matrix and the decoding semantic chunk vector.

According to another aspect of the present disclosure, there is provided a method of selecting a domain semantic chunk, the method including: selecting a predetermined number of N-grams on the basis of a domain corpus; generating embedding values of the N-grams; computing similarities between each of the N-grams on the basis of the embedding values of the N-grams; generating an N-gram graph on the basis of the similarities; determining values of N-gram nodes included in the N-gram graph on the basis of the N-gram graph; and selecting a domain semantic chunk from among the N-grams on the basis of the values of the N-gram nodes.

In the method, in the selecting of the predetermined number of N-grams, N-grams may be extracted from the domain corpus, and the predetermined number of N-grams may be selected through filtering based on frequencies of the extracted N-grams.

In the method, in the generating of the N-gram graph, the similarities between each of the N-grams may be computed using an approximate nearest neighbor (ANN) technique on the basis of the embedding values of the N-grams.

In the method, in the determining of the values of the N-gram nodes, the values of the N-gram nodes may be determined using a PageRank algorithm on the basis of the N-gram graph.

According to still another aspect of the present disclosure, there is an apparatus for domain-adapting a pre-trained language model, the apparatus including: a semantic chunk selection module configured to select a predetermined number of N-grams on the basis of a domain corpus, to generate an N-gram graph on the basis of embedding values of the N-grams, to select a domain semantic chunk from among the N-grams on the basis of the N-gram graph, and to store the selected domain semantic chunk in a semantic chunk DB; and a domain adaptation module configured to generate an encoding hidden vector sequence on the basis of an input sentence, to extract a domain semantic chunk, found as a result of searching the semantic chunk DB, from the input sentence, to update the encoding hidden vector sequence on the basis of the domain semantic chunk extracted from the input sentence, to generate a decoding hidden vector sequence on the basis of an output sentence and the updated encoding hidden vector sequence, to extract a domain semantic chunk, found as a result of searching the semantic chunk DB, from the output sentence, to update the decoding hidden vector sequence on the basis of the domain semantic chunk extracted from the output sentence, and to compute an output probability for the output sentence on the basis of the updated decoding hidden vector sequence.

In the apparatus, the semantic chunk selection module may compute similarities between each of the N-grams on the basis of the embedding values of the N-grams and may generate the N-gram graph on the basis of the similarities.

In the apparatus, the semantic chunk selection module may determine values of N-gram nodes included in the N-gram graph on the basis of the N-gram graph and may select the domain semantic chunk from among the N-grams on the values of the N-gram nodes.

In the apparatus, the semantic chunk selection module may determine the values of the N-gram nodes using a PageRank algorithm on the basis of the N-gram graph.

In the apparatus, the domain adaptation module may generate the encoding hidden vector sequence by applying token separation, embedding, and self-attention on the basis of the input sentence.

In the apparatus, the domain adaptation module may generate an output embedding vector by applying token separation and embedding on the basis of the output sentence and may generate the decoding hidden vector sequence using cross attention and self-attention on the basis of the output embedding vector and the updated encoding hidden vector sequence.

In the apparatus, the domain adaptation module may generate an input sentence semantic chunk embedding vector on the basis of the domain semantic chunk extracted from the input sentence, may generate an encoding semantic chunk vector by applying self-attention to the input sentence semantic chunk embedding vector, may generate an encoding semantic chunk position matrix on the basis of a positional relationship between a token of the input sentence and the domain semantic chunk extracted from the input sentence, and may update the encoding hidden vector sequence on the basis of the encoding semantic chunk vector and the encoding semantic chunk position matrix.

In the apparatus, the domain adaptation module may generate an output sentence semantic chunk embedding vector on the basis of the domain semantic chunk extracted from the output sentence, may generate a decoding semantic chunk vector by applying self-attention to the output sentence semantic chunk embedding vector, may generate a decoding semantic chunk position matrix on the basis of a positional relationship between a token of the output sentence and the domain semantic chunk extracted from the output sentence, and may update the decoding hidden vector sequence on the basis of the decoding semantic chunk vector and the decoding semantic chunk position matrix.

In the apparatus, the domain adaptation module may generate an attention-based encoding semantic chunk position matrix through an attention technique by applying a value of the elementwise product of the encoding semantic chunk vector and the encoding semantic chunk position matrix, as a key of attention, and applying the encoding hidden vector sequence as a query of attention, and may update the encoding hidden vector sequence on the basis of the attention-based encoding semantic chunk position matrix and the encoding semantic chunk vector.

The present disclosure features two distinctions when compared with a T-DNA in the related art: (1) introduction of a PageRank technique in a procedure for selecting a domain semantic chunk; and (2) sophistication on a per-semantic chunk basis and on a per-token basis in an integration procedure for a domain semantic chunk model.

According to the present disclosure, an approach specialized for encoding can also be utilized for decoding, and thus the present disclosure can find application in various fields.

In a PA approach, a training parameter, based on a sub-word, such as a prefix, infix, or suffix, that constitutes one word in the existing research, applies to a sub-chunk, such as a prefix, infix, or suffix, that constitutes a semantic chunk. Thus, internal structure information of the semantic chunk can be utilized.

The method of domain-adapting a PLM according to the present disclosure ensures higher classification performance than a simple domain fine-tuning approach in the related art. Particularly, the method according to the present disclosure can achieve a significant effect when applied to specialized fields, such as medicine, pharmacy, and chemistry, in which there is a notable discrepancy with training data of the PLM.

The present disclosure is not limited to the above-mentioned. From the subsequent detailed description, an effect not mentioned would be readily apparent to a person of ordinary skill in the art to which the present disclosure pertains.

DETAILED DESCRIPTION

Figure 1:
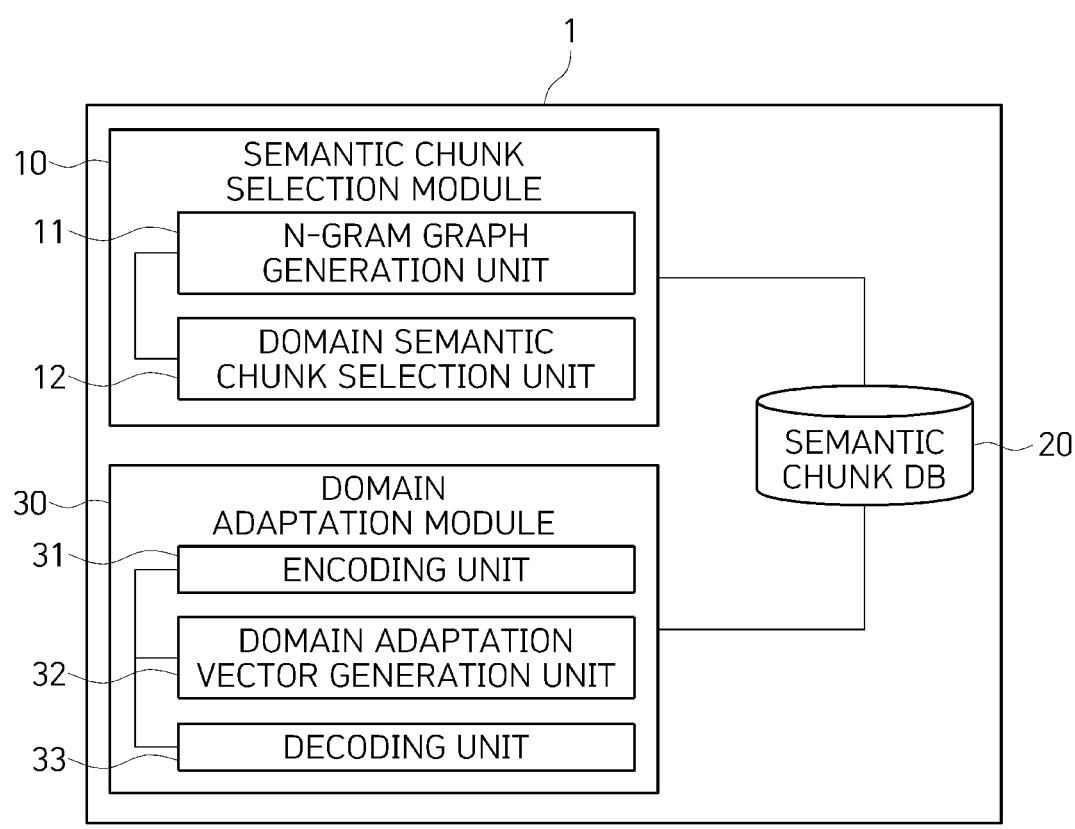
FIG. 1 is a block diagram illustrating a configuration of a domain adaptation apparatus for a pre-trained language model according to an exemplary embodiment of the present disclosure.

The present disclosure proposes two approaches for achieving performance when utilizing a domain PLM. The first approach is a method of selecting a domain semantic chunk using PageRank. The second approach is a method of domain-adapting a large-capacity pre-trained language model (PLM) using semantic chunk dynamic weight masking, the method integrating a PLM and domain semantic chunk information. According to the present disclosure, the term "dynamic" is used to mean that context is reflected. Therefore, "dynamic weight" refers to a weight that reflects context. Throughout the present specification, "context" refers to various input sentences or input text that changes in real time. Context in mathematical equations mentioned in the present specification corresponds to a hidden vector sequence H (expressed as $H_e$ in the case of an encoder and as Ha in the case of a decoder) that serves as the query of attention.

A domain adaptation procedure, such as fine-tuning training, is required to utilize the large-capacity PLM for a specific domain. Attempts in existing research have been made to improve performance of a PLM through domain adaptor technology based on an N-gram in order to reduce errors on the basis of the results of domain text error analysis of the PLM.

The present disclosure introduces a method of selecting a domain semantic chunk through a main semantic chunk graph and PageRank based on existing domain adaptor research. This method is disclosed, with the N-gram as an implementation example of a semantic chunk. In order to select a new domain semantic chunk, first, an existing frequency-based N-gram is extracted. Then, an N-gram graph is generated by connecting similar N-grams using external word embedding information. Lastly, the domain semantic chunk is extracted using a PageRank algorithm.

In addition, the present disclosure introduces a method of domain-adapting a large-capacity PLM using semantic chunk dynamic weight masking, which reflects an output value of a PLM rather than simply integrating embedding values of semantic chunks, in a semantic chunk domain adaptor technology. The method of domain-adapting a large-capacity PLM using semantic chunk dynamic weight masking according to the present disclosure enables reflection of the relative importance between semantic chunks and the position-dependent characteristics of words that constitutes a semantic chunk, and thus, the domain performance of the PLM can be ensured.

The present disclosure introduces various dynamic weight masking methods that improve existing T-DNA in a process of integrating semantic chunk information into a transformer-based pre-trained language model. The dynamic weight masking methods that can apply to the present disclosure may include (1) a local weight (LW) approach that estimates weights of tokens that constitute a semantic chunk, (2) a global weight (GW) approach that integrates one or more semantic chunks present in one sentence using different weights, (3) a position-aware approach that adds a position-aware training weight of a token that constitutes a semantic chunk, (4) attention-based weight masking, (5) gate-based weight masking, and the like. Various combinations of the above-mentioned dynamic weight masking methods can be verified through experiments and may be selected according to the results of the verification. For example, the LW approach and the PA approach may be combined for the dynamic weight masking.

In addition, the N-gram is extracted using the PageRank algorithm before the dynamic weight masking, and then, one of the above-mentioned dynamic weight masking methods can be used. For example, in a case where a combination of PageRank and the GW approach improves existing baseline performance across all evaluation sets, the combination may be selected.

Advantages and features of the present disclosure, and methods of achieving the advantages and features will be apparent from embodiments that will be described in detail below with reference to the accompanying drawings. However, the present disclosure is not limited to the embodiments that will be disclosed below and can be implemented in various different forms. The embodiments are only provided to make the present disclosure complete and to provide definite notice as to the scope of the present disclosure to a person of ordinary skill in the art to which the present disclosure pertains. The scope of the present disclosure should be only defined by claims. The terms used in the present specification are for describing the embodiments and are not intended to impose any limitation on the present invention. Unless specified otherwise throughout the present specification, a singular noun or a singular noun phrase may have a plural meaning. The terms "comprise" and/or "comprising" used in the specification should be construed to mean "including constituent element, step, operation, and/or element that follows "comprises" and/or "comprising," but not excluding the presence or addition of one or more other constituent elements, steps, operations, and/or elements.

It should be understood that a constituent element, when referred to as "being connected to" or "having access to" a different constituent element, may also be directly connected to or have direct access to the different constituent element or may also be connected to or have access to the different constituent element with a third constituent element in between. Likewise, it should be understood that a constituent element, when referred to as "being directly connected to" or "have direct access to" a different constituent element, may be connected to or have access to the different constituent element without a third constituent element in between. The same is true for terms referring to a relationship between constituent elements. For example, the terms "between" and "directly between" and the terms "adjacent to" and "directly adjacent to" should also be construed in the same manner.

In addition, a specific description of a well-known technology associated with the present disclosure will be omitted from the description of the present disclosure when determined as making the nature and gist of the present invention obfuscated.

Reference documents [1] to [5} related to the present disclosure are as follows. Throughout the present specification, each reference document or a methodology proposed in the reference document can be referred to by the number assigned to the reference document as follows.

[1] Shizhe Diao et al., "Taming Pre-trained Language Models with N-gram Representations for Low-Resource Domain Adaptation," in Proceedings of the 59th Annual Meeting of the Association for Computational Linguistics, 2021.

[2] Xin Liu et al., "Bridging Subword Gaps in Pretrain-Finetune Paradigm for Natural Language Generation," in Proceedings of the 59th Annual Meeting of the Association for Computational Linguistics, 2021.

[3] Lawrence Page et al., "The PageRank citation ranking: Bringing order to the web," Stanford InfoLab, 1999.

[4] Andreas Stolcke, "SRILM—an extensible language modeling toolkit," Interspeech, 2002.

[5] Piotr Bojanowski et al., "Enriching Word Vectors with Subword Information," arXiv preprint arXiv: 1607.04606, 2016.

The embodiments of the present disclosure will be described in detail below with reference to the accompanying drawings. In order to facilitate a comprehensive understanding of the present disclosure, throughout the specification, the same reference numeral is assigned to the same constituent elements regardless of figure numbers.

FIG. 1 is a block diagram illustrating a configuration of a domain adaptation apparatus 1 for a pre-trained language model according to an exemplary embodiment of the present disclosure.

The domain adaptation apparatus 1 for a pre-trained language model according to an embodiment of the present disclosure (hereinafter referred to as "domain adaptation apparatus" for short) includes a semantic chunk selection module 10, a semantic chunk DB 20, and a domain adaptation module 30.

The semantic chunk selection module 10 includes an N-gram graph generation unit 11 and a domain semantic chunk selection unit 12. The domain adaptation module 30 includes an encoding unit 31, a domain adaptation vector generation unit 32, and a decoding unit 33.

The domain adaptation apparatus 1 according to an embodiment of the present disclosure is illustrated in FIG. 1. The domain adaptation apparatus 1 according to the present disclosure is not limited to constituent elements of domain adaptation apparatus 1 according to an embodiment that are illustrated in FIG. 1. A constituent element may be added, modified, or omitted whenever necessary.

The semantic chunk selection module 10 selects a predetermined number of N-grams on the basis of domain corpus and generates N-gram embedding values (an N-gram embedding vector) of the selected N-grams. The semantic chunk selection module 10 computes similarities between each of the selected N-grams on the basis of the embedding values of the N-grams and generates an N-gram graph on the basis of the similarities. The semantic chunk selection module 10 determines values of N-gram nodes included in the N-gram graph on the basis of the N-gram graph, selects a domain semantic chunk from among the N-grams according to an order of priority on the basis of the values of the N-gram nodes, and stores the selected domain semantic chunk in the semantic chunk DB 20.

The domain adaptation module 30 generates an encoding hidden vector sequence on the basis of an input sentence and updates the encoding hidden vector sequence on the basis of the domain semantic chunk extracted from the input sentence. The domain adaptation module 30 generates a decoding hidden vector sequence on the basis of an output sentence and an updated encoding hidden vector sequence and updates the decoding hidden vector sequence on the basis of a domain semantic chunk extracted from the output sentence. The domain adaptation module 30 computes an output probability for the output sentence on the basis of an updated decoding hidden vector sequence. When extracting the domain semantic chunk from the input sentence and the output sentence, the domain adaptation module 30 may utilize the semantic chunk DB 20. In this case, the domain adaptation module 30 updates the encoding hidden vector sequence or the decoding hidden vector sequence on the basis of a semantic chunk that is found as a result of searching the semantic chunk DB 20, among semantic chunks included in the input sentence and the output sentence.

Operations of constituent elements included in the semantic chunk selection module 10 and the semantic chunk DB 20 of the domain adaptation apparatus 1 will be described in detail below with reference to FIGS. 2 to 5.

Figure 2:
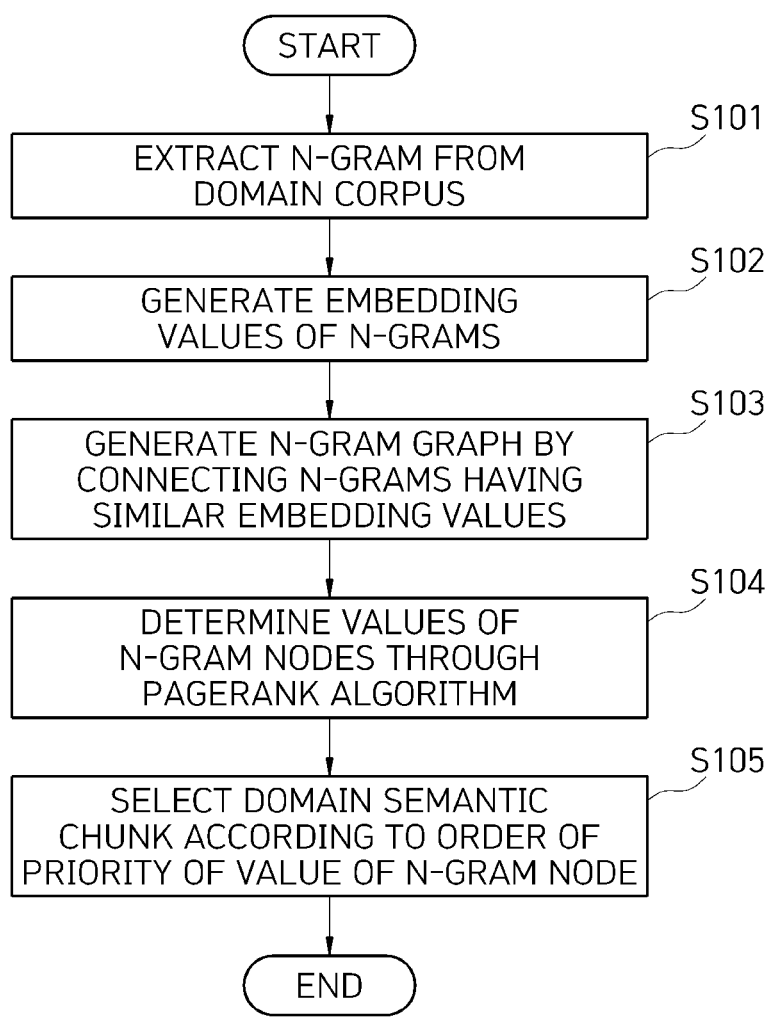
FIG. 2 is a flowchart that is referred to for description of a method of selecting a domain semantic chunk according to an exemplary embodiment of the present disclosure.

FIG. 2 is a flowchart that is referred to for description of a method of selecting a domain semantic chunk according to an exemplary embodiment of the present disclosure. The method of selecting a domain semantic chunk according to an embodiment of the present disclosure is used to select a semantic chunk of a new domain and to establish a semantic chunk DB for the new domain.

For convenience of description, it is assumed that the method of selecting a domain semantic chunk according to an embodiment of the present disclosure is performed by the semantic chunk selection module 10 of the domain adaptation apparatus 1.

The domain n apparatus 1 generates the semantic chunk DB 20 by performing the method of selecting a domain semantic chunk according to an embodiment of the present disclosure in FIG. 2.

With reference to FIG. 2, the method of selecting a domain semantic chunk according to an embodiment of the present disclosure includes Steps S101 to S105. The method of selecting a domain semantic chunk according to an embodiment of the present disclosure is illustrated in FIG. 2. The method of selecting a domain semantic chunk according to the present disclosure is not limited to steps illustrated in FIG. 2. A step may be added, modified, or omitted whenever necessary.

In Step S101, an N-gram is extracted from a domain corpus. The N-gram graph generation unit 11 extracts the N-gram from the domain corpus. For example, the N-gram graph generation unit 11 extracts a 5-gram from the domain corpus using a SRILM (refer to the reference document [4]). The N-gram graph generation unit 11 may set an entire size of N-grams to an n-fold multiple of a size of a reference N-gram. The N-gram graph generation unit 11 may filter the extracted N-grams based on their frequencies and may select N-grams whose entire size is the same as a preset entire size of N-grams. The "entire size of N-grams" refers to the entire number of N-grams.

In Step S102, an embedding value of the N-gram is generated. The N-gram graph generation unit 11 generates an embedding value of the selected N-gram (also referred to as "N-gram embedding vector"). For example, the N-gram graph generation unit 11 obtains the embedding value of the N-gram using a fastText technique (refer to the reference document [5]).

In Step S103, an N-gram graph is generated. The N-gram graph generation unit 11 generates the N-gram graph by connecting N-grams that have similar embedding values. The N-gram graph generation unit 11 may determine N-grams, each with a preset similarity reference value or higher, as being similar, and may connect nodes representing these N-grams to each other. In addition, the N-gram graph generation unit 11 may limit the number of the connected N-gram nodes according to setting. For example, the N-gram graph generation unit 11 generates the N-gram graph by connecting a maximum number of 15 similar N-gram nodes to each other according to the embedding values of the N-grams. The N-gram graph generation unit 11 may use cosine similarity in order to measure the similarity of the embedding values of the N-grams and may use an approximate nearest neighbor (ANN) technique that can directly search for embedding values of similar N-grams when searching for a great number of N-grams. The ANN technique pre-indexes similarities and thus is useful in searching for a great number of N-grams.

In Step S104, a value of the N-gram node is determined. The domain semantic chunk selection unit 12 determines the value of the N-gram node on the N-gram graph generated by the N-gram graph generation unit 11. The domain semantic chunk selection unit 12 may determine the value of the N-gram node using the PageRank algorithm (refer to the reference document [3]) on the basis of the N-gram graph.

The PageRank algorithm is expressed by Mathematical Equation 1.

$$PR(u) = c \times \sum_{v \in B_u} \frac{PR(v)}{N_v} + (1-c) \times \frac{1}{N} \qquad \text{Mathematical Equation 1}$$

In Mathematical Equation 1, u and v refer to two N-grams on the N-gram graph, PR (v) is a PR value of N-gram v, that is, an N-gram node value of v, PR(u) is a PR value of N-gram u, that is, an N-gram node value of u, $B_u$ is the N-grams that are referred to by u, $N_v$ is the number of N-grams that refers to v, N is an entire size (number of N-grams), and c serves as a damping factor and is a factor for adjusting a strength with which an algorithm applies.

On the basis of the N-gram graph, the domain semantic chunk selection unit 12 regards a graph edge as being bidirectional and determines a PR value of each N-gram node (a value of an N-gram node) on the N-gram graph by applying the PageRank algorithm.

In Step S105, a domain semantic chunk is selected. The domain semantic chunk selection unit 12 selects a final domain N-gram according to an order of priority of values of the N-gram nodes. This final domain N-gram is the domain semantic chunk. That is, the domain semantic chunk selection unit 12 aligns the values of the N-gram nodes and selects the domain semantic chunk based on an order of priority of the values of the N-gram nodes. The domain semantic chunk selection unit 12 stores the selected domain semantic chunk in the semantic chunk DB 20.

The semantic chunk DB 20 is established through the steps described above.

Figure 3:
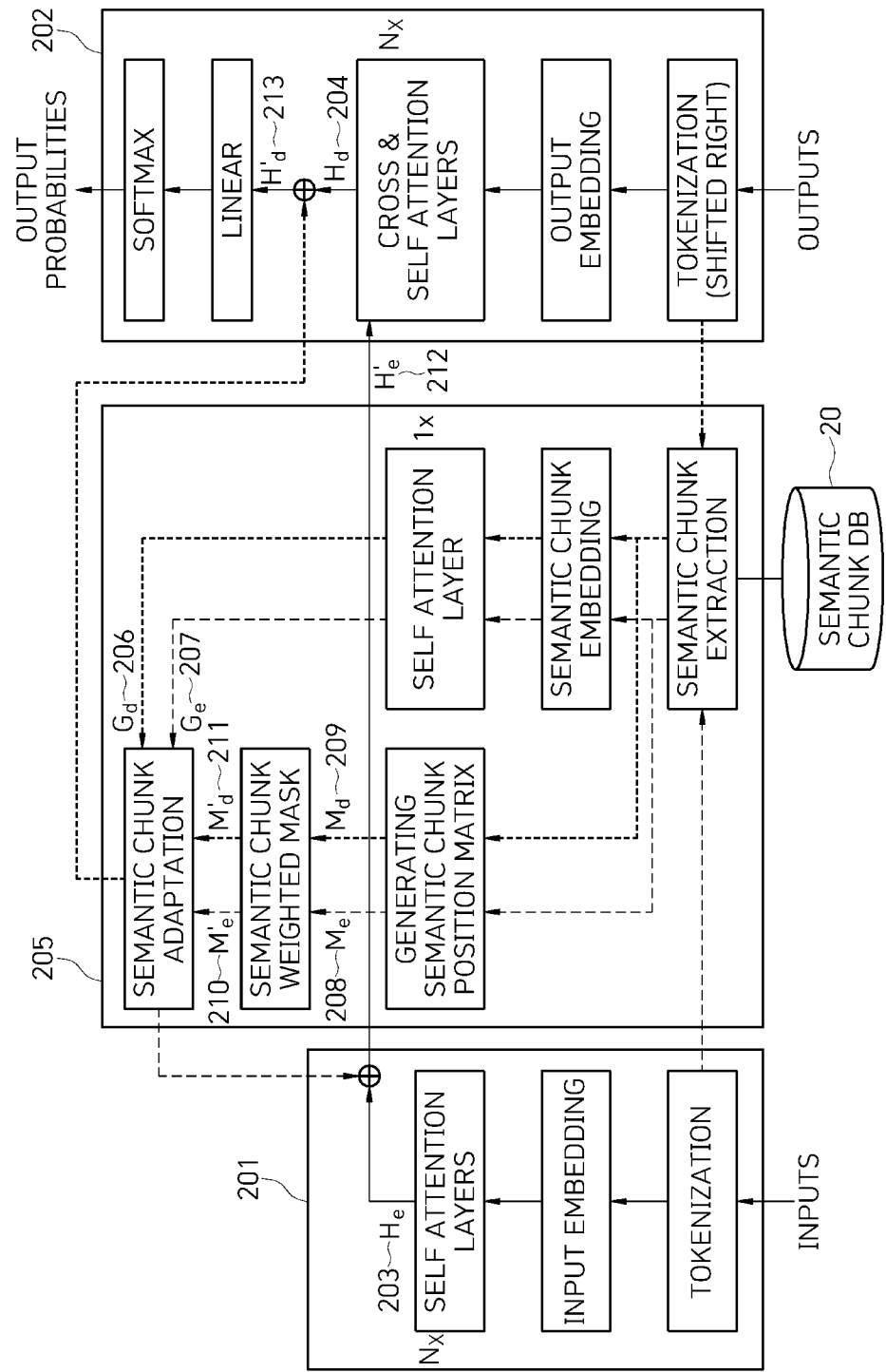
FIG. 3 is a block diagram that is referred to for description of a process of applying semantic chunk dynamic weight masking to a transformer encoder PLM according to an exemplary embodiment of the present disclosure.
Figure 4:
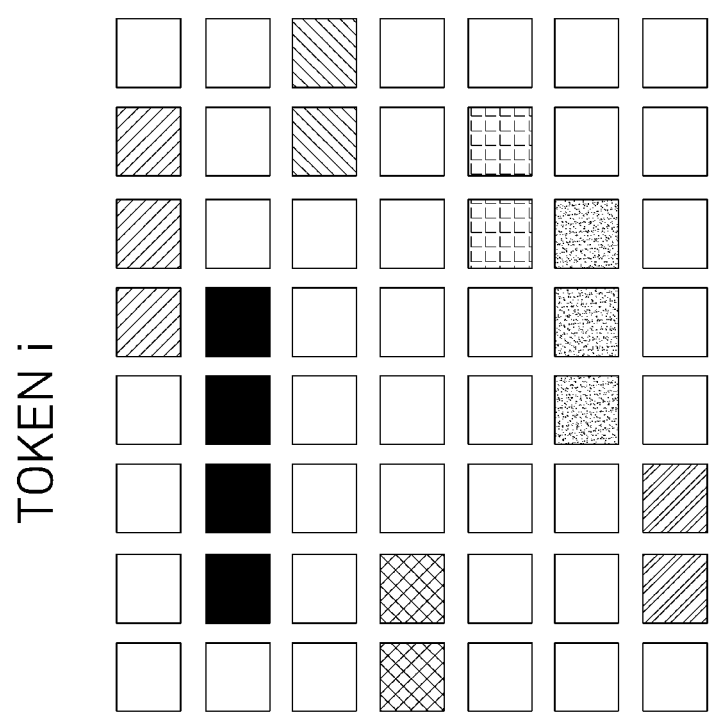
FIG. 4 is a block diagram illustrating an attention-based semantic chunk position matrix.

FIG. 3 is a block diagram that is referred to for description of a process of applying semantic chunk dynamic weight masking to a transformer encoder PLM according to an exemplary embodiment of the present disclosure. The process according to an embodiment of the present disclosure that is illustrated in FIG. 3 relates to a method of dynamically integrating a PLM and domain semantic chunk information. For convenience of description, it is assumed that the method of dynamically integrating a PLM and domain semantic chunk information according to an embodiment the present disclosure is performed by the domain adaptation module 30 of the domain adaptation apparatus 1.

The process in FIG. 3 is broadly divided into two sub-processes: a transformer sub-process 201 and 202 and a semantic chunk computation sub-process 205 for domain-adapting a PLM. The transformer sub-process (201 and 202) is configured to include encoding 201 and decoding 202. The encoding 201 is performed by the encoding unit 31, the semantic chunk computation sub-process 205 is performed by the domain adaptation vector generation unit 32, and the decoding 202 is performed by the decoding unit 33.

The left portion of FIG. 3 corresponds to the encoding 201 in the transformer sub-process. In the encoding 201, the encoding unit 31 generates an encoding hidden vector sequence $H_e$ 203 through token separation, embedding, and self-attention on the basis of inputs. The inputs here may be a sentence (hereinafter referred to as "input sentence" for short) that is input into the domain adaptation module 30.

The right portion of FIG. 3 corresponds to the decoding 202 in the transformer sub-process. The decoding unit 33 performing the token separation on the basis of outputs and then acquires an output embedding value (an output embedding vector) by performing rightward shifting and embedding operations. The outputs here may be in the form of a sentence. In a case where the outputs are in the form of a sentence, the corresponding sentence is referred to as a "generation sentence," or an "output sentence."

The decoding unit 33 inputs the encoding hidden vector sequence $H_e$ 203 generated by the encoding unit 31 into cross & self-attention layers and thus generates a decoding hidden vector sequence $H_d$ 204. Then, the decoding unit 33 generates probability values of output tokens through a linear structure and Softmax on the basis of the decoding hidden vector sequence $H_d$. The decoding 202 is performed through partial sequence computation (in an autoregressive manner) that is repeated progressively on a per-token position basis. For reference, in the partial sequence computation, a sentence is generated on a token (word)-by-token (word) basis rather than being generated all at once. In this technique, (i−1)-th outputs are "outputs," illustrated in FIG. 3, that are input from below, and an output probabilities of a (i-th) token is output from top.

The middle portion of FIG. 3 corresponds to the semantic chunk computation sub-process 205, which is a procedure of adapting a PLM to an application domain. The semantic chunk computation sub-process 205 is performed by the domain adaptation vector generation unit 32. In the semantic chunk computation sub-process 205, computation for semantic chunk adaptation is performed to improve performance of an encoder-decoder model. According to the present disclosure, on the assumption that domains of the encoding and the decoding are the same, the encoding 201 and the decoding 202 are integrated into a single computing operation, and the resulting computing operation is described. Like in a translation environment, if the domains of the encoding 201 and the decoding 202 are different from each other, that is, if languages are different from each other, a semantic chunk flow 205 needs to be made up of two separated semantic computation procedures 205 suitably for the domains. That is, if the domains of the encoding 201 and the decoding 202 are different from each other, the semantic chunk computation sub-process 205 needs to be made up of a semantic chunk sub-process 205-1 for the domain of the encoding 201 and a semantic chunk computation sub-process 205-2 for the domain of the decoding 202. The semantic chunk sub-process 205-1 and the semantic chunk computation sub-process 205-2 are performed suitably for the domains, respectively.

A semantic chunk computation procedure 205 executed by the domain adaptation vector generation unit 32 will be described below.

First, on the basis of an input sentence (inputs), the domain adaptation vector generation unit 32 searches the pre-established semantic chunk DB 20 for semantic chunks of the input sentence and extracts the semantic chunks of the input sentence. That is, the domain adaptation vector generation unit 32 extracts the semantic chunks of the input sentences (inputs) from the semantic chunk DB 20. In addition, on the basis of an output sentence (outputs), the domain adaptation vector generation unit 32 searches the semantic chunk DB 20 for semantic chunks of the output sentence and extracts the semantic chunks of the output sentence.

When it is assumed that the domains of the encoding 201 and the decoding 202 are the same, the same semantic chunk computation procedure 205 described below applies to the semantic chunks of the input sentence and the semantic chunks of the output sentence. Therefore, the semantic chunk computation procedure 205 is described using common symbols for data for the encoding 201 and data for decoding 202. In FIG. 3, the subscript e denotes the data for the encoding 201, and the subscript d denotes the data for the decoding 202. In a case where the same description applies to the data for the encoding 201 and the data for the decoding 202, the subscripts e and d are omitted when describing the semantic chunk computation procedure 205. In the semantic chunk computation procedure 205, a dashed line indicates a computation flow for the data for the encoding 201, and a thick dotted line indicates a computation flow for the data for the decoding 202.

For example, $G_e$ is a semantic chunk vector of the encoding 201, and $G_d$ is a semantic chunk vector of the decoding 202. A description that commonly applies can be denoted by a semantic chunk vector G. $H_e$ is a hidden vector sequence of the encoding 201, and $H_d$ is a hidden vector sequence of the decoding 202. A description that commonly applies can be denoted by a hidden vector sequence H. $M_e$ is a semantic chunk position matrix of the encoding 201, and $M_d$ is a semantic chunk position matrix of the decoding 202. A description that commonly applies can be denoted by a semantic chunk position matrix M.

The domain adaptation vector generation unit 32 generates an embedding vector by inputting the extracted semantic chunk into an external embedding module. Then, the domain adaptation vector generation unit 32 generates a semantic chunk vector G 206 and 207 for semantic chunks, respectively, that are included in a sentence, through a single self-attention layer on the basis of the embedding vector. For example, the domain adaptation vector generation unit 32 embeds the semantic chunk using the fastText technique (refer to the reference document [5]). In order to combine the resulting semantic chunk with a PLM, the domain adaptation vector generation unit 32 generates the semantic chunk vector G 206 and 207 through parameters of the lowermost self-attention layer of the PLM.

The domain adaptation vector generation unit 32 generates a semantic chunk positions matrix M 208 and 209 on the basis of the sentence (the input sentence or the output sentence) and the semantic chunks of the sentence. The sentence and expressions of the semantic chunks that make up the sentence are collectively represented as the semantic chunk position matrix M 208 and 209 that is a single matrix. A row in the semantic chunk position matrix M represents sub-words ($token_i$) that make up a sentence, and a column therein represents an N-gram, that is, a semantic chunk ($chunk_j$), that is included in the sentence. A value of a matrix represents whether or not one sub-word ($token_i$) is included in the semantic chunk. When one sub-word is included, the matrix has a value of 1, and, when one sub-word is not included, the matrix has a value of 0.

The domain adaptation vector generation unit 32 generates an attention-based semantic chunk position matrix M' on the basis of the semantic chunk position matrix M. The domain adaptation vector generation unit 32 computes a dynamic weight of semantic chunk information within the semantic chunk position matrix M 208 and 209 using Softmax $(QK^T)V$, which is an attention method, and generates the attention-based semantic chunk position matrix M', reflecting the computed dynamic weight. In a case where the domain adaptation vector generation unit 32 computes the dynamic weight, when application in the column direction (global dim) of the semantic chunk position matrix M is available, a global weight (GW) is obtained. Furthermore, when application in the row direction (local dim) of the semantic chunk position matrix M is available, a local weight (LW) is obtained. This process is expressed as a semantic chunk weighted mask in FIG. 3.

A specific example of this process is described. As described above, a row in the semantic chunk position matrix M represents a token that constitutes a sentence, and a column therein represents a semantic chunk included in the sentence. One token here may correspond to a multiplicity of semantic chunks. Normalization in the column direction (global dim) makes ratios of semantic chunks, which make up one token, add up to 1 (GW). The second token in a matrix in FIG. 4 corresponds to three chunks. GW is a technique that makes weights of these three chunks add up to 1. LW (local dim) is a technique that makes weights of tokens corresponding to each chunk add up to 1.

The encoding unit 31 and the decoding unit 33 generate hidden vector sequences H 203 and 204, respectively, through the existing PLM on the basis of the token-separated sentence (the input sentence or the output sentence). The domain adaptation vector generation unit 32 may obtain an attention-based semantic chunk position matrix M' 210 and 211 by applying the hidden vector sequence H 203 and 204 as Query Q of attention and M∘G as Key K of attention. M∘G refers to the elementwise product (Hadamard product) of M and G. That is, M∘G is generated by multiplying components positioned in the same column and row in M and G.

The domain adaptation vector generation unit 32 may compute the attention-based semantic chunk position matrix M' according to Mathematical Equations 2 and 3.

$$M' = L_1\left(\text{softmax}\left(\exp\left(\frac{H \cdot (M \circ G + \alpha)^T}{\sqrt{d}}\right) \circ \frac{M}{t}, \tau\right), \tau\right)$$ Mathematical Equation 2

$$\tau = (\text{global}_{dim} | \text{local}_{dim})$$ Mathematical Equation 3

The meanings of symbols used in Mathematical Equations 2 and 3 are described as follows. $L_1$ refers to L1 normalization of a vector. τ expresses a global dimensional normalization that refers to normalization of a row in a matrix, and a local dimensional normalization that refers to normalization of a column in the matrix. That is, τ represents a dimension in which computation is to be performed. τ may be a dimensional value that determines GW and LW. Regarding a matrix, in the case of LW, τ=0 (0 dimension), and in the case of GW, τ=1 (one dimension). d is a dimensional value of a training parameter. α refers to a token position-aware vector that depends on a position on a semantic chunk of an input token. t refers to a temperature that applies to Softmax computation, and serves to adjust strengths of Softmax probability values.

As an example, the domain adaptation vector generation unit 32 may compute the attention-based semantic chunk position matrix M' according to Mathematical Equations 3 and 4 (Equations in which application through a gate method is available using sigmoid), instead of Softmax.

$$M' = L_1(\text{sigmoid}(\exp(H \cdot (M \circ G + \alpha)^T) \circ M) - 0.5, \tau)$$ Equation 4

The domain adaptation vector generation unit 32 may compute the attention-based semantic chunk position matrix M' by applying an additional training parameter that varies with a position of a token that constitutes a semantic chunk and by applying a position-aware (PA) method reflecting a positional information of the token that constitutes the semantic chunk. A token position-aware vector α included in Mathematical Equation 2 may be computed by Mathematical Equation 5. As described above, the token position-aware vector α, included in Mathematical Equation 2, is added to M∘G, which is a value of a key of attention, and then is used to compute a value of the attention-based semantic chunk position matrix M' 210 and 211.

$$\text{PositionAware } \alpha = I \circ W, I \in R^{1 \times 3}, W \in R^{3 \times d},$$ Mathematical Equation 5

Token position information I in Mathematical Equation 5 is generated on the basis of the semantic chunk position matric M 208 and 209. That is, the domain adaptation vector generation unit 32 generates the token position information I on the basis of the semantic chunk position matrix M. The domain adaptation vector generation unit 32 determines on the basis of the semantic chunk position matrix M whether each token is a prefix, an infix, or a suffix of the semantic chunk, and generates the token position information I. For example, the domain adaptation vector generation unit 32 may generate the token position information I in such a manner that a token (the prefix) in the front of the semantic chunk has a value of 1, that a token (the suffix) in the rear of the semantic chunk has a value of 3, and that a token in a portion other than the front and the rear of the semantic chunk has a value of 2. The token position information I serves to determine through the existing semantic chunk position matrix M 208 and 209 whether one token is the prefix, the infix, or the suffix of the semantic chunk, to determine a corresponding W, and to reflect the resulting W in computation. W serves as a token position-aware parameter, is randomly initialized in an initial training, and, according to a training process, is trained as a prefix, infix, or suffix parameter. In Mathematical Equation 5, I∘W refers to the elementwise product (Hadamard product) of I and W.

When the attention-based semantic chunk position matrix M' and the semantic chunk vector G are generated, the domain adaptation vector generation unit 32 executes a semantic chunk adaptation procedure that is a final stage of the semantic chunk computation procedure 205. The domain adaptation vector generation unit 32 generates a domain adaptation vector M'·G on the basis of the attention-based semantic chunk position matrix M' and the semantic chunk vector G. The domain adaptation vector generation unit 32 may generate a domain adaptation vector M'·G through a matrix multiplication operation of multiplying the attention-based semantic chunk position matrix M' 210 and 211 and the semantic chunk vector G 206 and 207.

In Mathematical Equation 6, the domain adaptation vector generation unit 32 generates a hidden vector sequence H' that results from updating the hidden vector sequence H 203 and 204 by applying a weight w to the domain adaptation vector M'·G.

$$H' = H + w \times M' \cdot G$$ Mathematical Equation 6

In Mathematical Equation 6, H serves as a hidden vector sequence and is denoted by $H_e$ in the case of the encoding 201 and by Ha in the case of the decoding 202. w denotes a weight of a domain adaptation vector. M'·G denotes a domain adaptation vector as the result of matrix multiplication of M' and G. The attention-based semantic chunk position matrix M' is an attention-based encoding semantic chunk position matrix $M_e'$ in the case of the encoding 201 and an attention-based encoding semantic chunk position matrix $M_d'$ in the case of the decoding 202. The semantic chunk vector G is an encoding semantic chunk vector $G_e$ in the case of the encoding 201 and a decoding semantic chunk vector Ga in the case of decoding 202.

By applying Mathematical Equation 6, the domain adaptation vector generation unit 32 may generate a hidden vector sequence $H_e'$ 212 in the case of the encoding 201 and may generate a hidden vector sequence $H_d'$ 213 in the case of d encoding 202.

The domain adaptation vector generation unit 32 may receive the hidden vector sequence $H_e$ 203 from the encoding unit 31. Then, the domain adaptation vector generation unit 32 may generate the hidden vector sequence $H_e'$ 212 that is updated by adding a domain adaptation vector $w_e \times M_e' \cdot G_e$, which results from weight multiplication, to the hidden sequence $H_e$ 203 and then may transfer the updated hidden vector sequence $H_e'$ 212 to the decoding unit 33. As an example, the encoding unit 31 may receive a domain adaptation vector $M_e' \cdot G_e$ from the domain adaptation vector generation unit 32. Then, the encoding unit 31 may generate a hidden vector sequence $H_e'$ 212 that is updated by multiplying the domain adaptation vector $M_e' \cdot G_e$ by a weight and then adding the hidden vector sequence $H_e$ 203 to the result of the multiplication, and then may transfer the updated hidden vector sequence $H_e'$ 212 to the decoding unit 33.

The decoding unit 33 generates the decoding hidden vector sequence $H_d$ 204 by inputting the output embedding vector and the updated encoding hidden vector sequence $H_e'$ 212 together into the cross & self-attention layers.

The domain adaptation vector generation unit 32 may receive the hidden vector sequence $H_d$ 204 from the decoding unit 33. Then, the domain adaptation vector generation unit 32 may generate the hidden vector sequence $H_d'$ 213 that is updated by adding domain adaptation vector $w_d \times M_d' \cdot G_d$, which results from weight multiplication, to the hidden vector sequence $H_d$ 204 and then may transfer the hidden vector sequence $H_d'$ 213 to the decoding unit 33. In this case, the decoding unit 33 computes the output probability by applying Linear and Softmax processes to the updated hidden vector sequence $H_d'$ 213. As another example, the decoding unit 33 receives the domain adaptation vector $w_d \times M_d' \cdot G_d$, which results from weight multiplication, from the domain adaptation vector generation unit 32. Then, the decoding unit 33 generates the hidden vector sequence $H_d'$ 213 that is updated by adding the hidden vector sequence $H_d$ 204 to the domain adaptation vector $w_d \times M_d' \cdot G_d$ and then computes the output probability by applying Linear and Softmax processes to the updated hidden vector sequence $H_d'$ 213.

Figure 5:
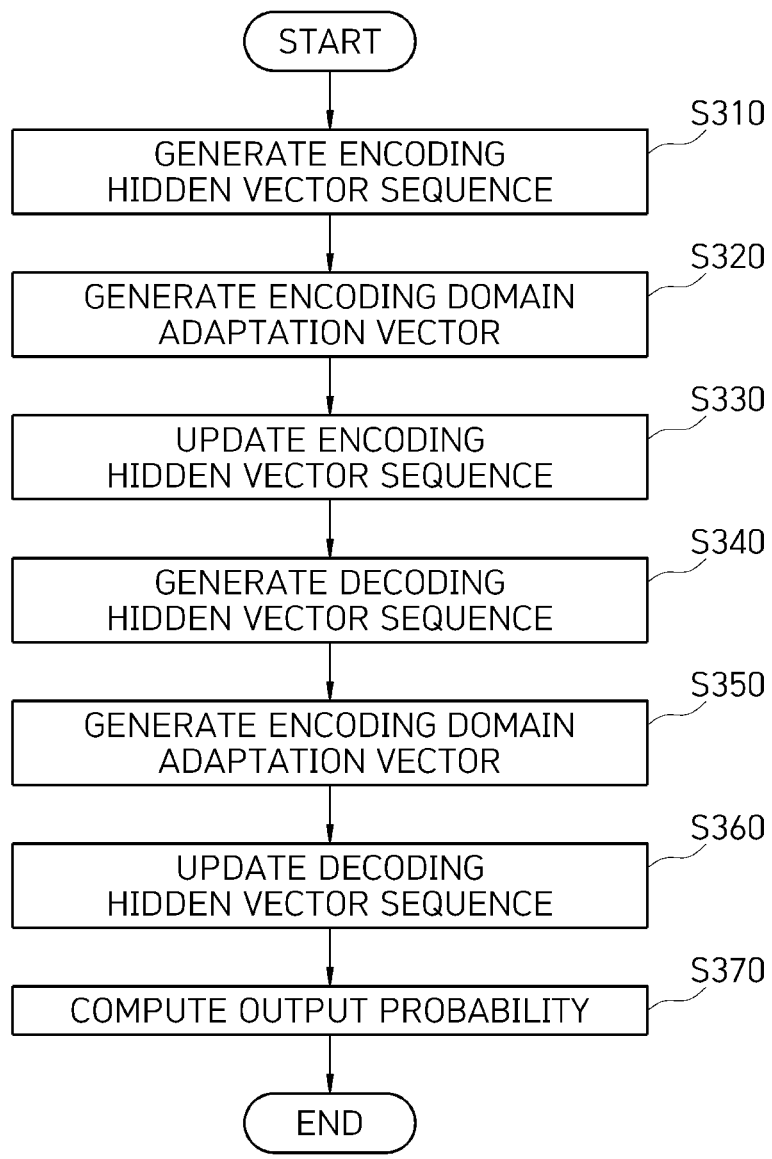
FIG. 5 is a flowchart that is referred to for description of a method of domain-adapting a pre-trained language model using semantic chunk dynamic weight masking according to an exemplary embodiment of the present disclosure.

FIG. 5 is a flowchart that is referred to for description of a method of domain-adapting a pre-trained language model using semantic chunk dynamic weight masking according to an exemplary embodiment of the present disclosure. For convenience of description, it is assumed that the method of domain-adapting a pre-trained language model using semantic chunk dynamic weight masking according to an embodiment of the present disclosure is performed by the domain adaptation module 30 of the domain adaptation apparatus 1.

With reference to FIG. 5, the method of domain-adapting a pre-trained language model using semantic chunk dynamic weight masking according to an embodiment of the present disclosure is configured to include Steps S310 to S370. The method of domain-adapting a pre-trained language model using semantic chunk dynamic weight masking according to an embodiment of the present disclosure is illustrated in FIG. 5. The method of domain-adapting a pre-trained language model using semantic chunk dynamic weight masking according to the present disclosure is not limited to steps illustrated in FIG. 5. A step may be added, modified, or omitted whenever necessary.

In Step S310, an encoding hidden vector sequence is generated. The domain adaptation module 30 generates an input token through token separation on the basis of an input sentence, generates an input embedding vector through embedding on the basis of the input token, and generates an encoding hidden vector sequence $H_e$ by applying self-attention to the input embedding vector.

In Step S320, an encoding domain adaptation vector is generated. First, the domain adaptation module 30 extracts a domain semantic chunk from the input sentence. The domain adaptation module 30 may extract a semantic chunk found as a result of searching the semantic chunk DB 20, as a domain semantic chunk of the input sentence, from among semantic chunks of the input sentence. Then, the domain adaptation module 30 generates an input sentence semantic chunk embedding vector on the basis of the domain semantic chunk of the input sentence. The domain adaptation module 30 generates an encoding semantic chunk vector $G_e$ by applying the self-attention to input sentence semantic chunk embedding vector. The domain adaptation module 30 generates an encoding semantic chunk position matrix $M_e$ on the basis of a positional relationship between a token of the input sentence and the domain semantic chunk extracted from the input sentence. The domain adaptation module 30 generates an attention-based encoding semantic chunk position matrix $M_e'$ through an attention technique by applying a value of the elementwise product of the encoding semantic chunk vector $G_e$ and the encoding semantic chunk position matrix $M_e$, as a key of attention, and applying the encoding hidden vector sequence $H_e$ as a query of attention. The domain adaptation module 30 generates an encoding domain adaptation vector $M_e' \cdot G_e$ on the basis of the encoding semantic chunk vector $G_e$ and the attention-based encoding semantic chunk position matrix $M_e'$.

In Step S330, an encoding hidden vector sequence is updated. The domain adaptation module 30 updates an encoding hidden vector sequence $H_e'$ by adding an encoding domain adaptation vector $w_e \times M_e' \cdot G_e$, which results from weight multiplication, to an encoding hidden vector sequence $H_e'$.

In Step S340, a decoding hidden vector sequence is generated. The domain adaptation module 30 generates an output token through the token separation on the basis of an output sentence, generates an output embedding vector through embedding on the basis of the output token, and generates a decoding hidden vector sequence Ha by cross attention and self-attention to the output embedding vector.

In Step S350, a decoding domain adaptation vector is generated. In Step S350, a decoding domain adaptation $M_d' \cdot G_d$ is generated in the same manner as in Step S320. Thus, a description of Step S350 is omitted.

In Step S360, the decoding hidden vector sequence is updated. The domain adaptation module 30 updates a decoding hidden vector sequence $H_d'$ by adding a decoding domain adaptation vector $w_d \times M_d' \cdot G_d$, which results from weight multiplication, to the decoding hidden vector sequence $H_d'$.

In Step S370, an output probability is computed. The domain adaptation module 30 computes the output probability by applying Linear and Softmax processes to the updated decoding hidden vector sequence $H_d'$.

The method of selecting a domain semantic chunk and the method of domain-adapting a pre-trained language model using semantic chunk dynamic weight masking are described above with reference to the flowcharts in FIGS. 2 and 5, respectively. The methods are described briefly above with reference to the illustrated sequence of blocks. However, the present disclosure is not limited to the order of the blocks. Several blocks may be performed in a different order than described in the present disclosure and illustrated in the flowcharts, or may be simultaneously performed. Various different combinations and divisions of the blocks and various different orders of the blocks can be realized to achieve the same or similar results. In addition, all the illustrated blocks may not be required to realize the methods described in the present specification.

As an implementation example of the present disclosure, the step described with reference to FIGS. 2 and 5 may be divided into sub-steps or may be configured with a combination of sub-steps. In addition, one or several steps may be omitted whenever necessary, and the order of steps may be changed.

The content in FIGS. 1 to 4, although not described with reference to FIG. 5, may apply to the content in FIG. 5. In addition, the content in FIG. 5 may apply to the content in FIGS. 1 to 4.

Figure 6:
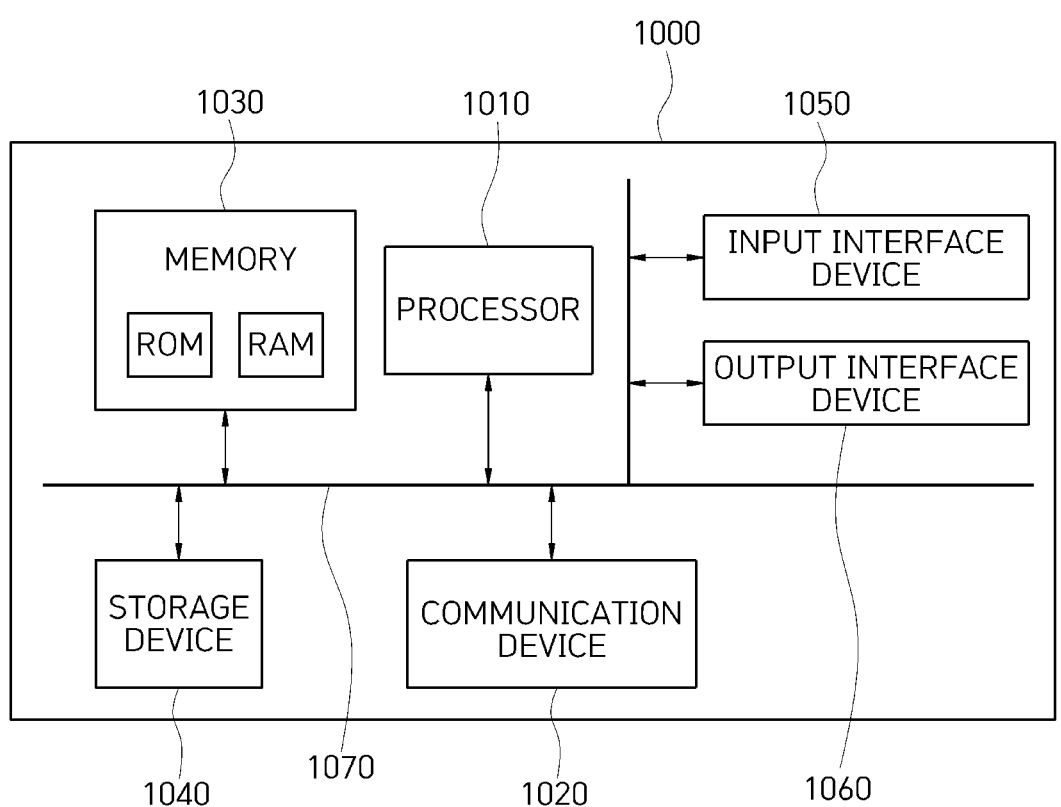
FIG. 6 is a block diagram illustrating a computer system that realizes the methods according to embodiments of the present disclosure.

FIG. 6 is a block diagram illustrating a computer system that realizes the methods according to embodiments of the present disclosure. The apparatus for domain-adapting a pre-trained language model, the method of selecting a domain semantic chunk, and the method of domain-adapting a pre-trained language model using semantic chunk dynamic weight masking may be realized in the form of the computer system in FIG. 6.

With reference to FIG. 6, a computer system 1000 may include at least one of a processor 1010 that performs communication through a bus 1070, a memory 1030, an input interface device 1050, an output interface device 1060, and a storage device 1040. The computer system 1000 may further include a communication device 1020 that has access to a network. The processor 1010 may be a central processing unit (CPU) or a semiconductor device executing commands stored in the memory 1030 or the storage device 1040. The memory 1030 and the storage device 1040 may include various types of volatile or nonvolatile storage media. Examples of the memory 1030 may include a read only memory (ROM) and a random access memory (RAM). The memory 1030 described in the present disclosure may be installed inside or outside the processor 1010 and may be connected to the processor 1010 through various known devices. The memory 1030 includes various types of volatile or nonvolatile storage media. For example, the memory 1030 may include ROM or RAM.

Therefore, the methods according to embodiments of the present disclosure may be realized as methods that can be performed on a computer or may be stored, together with computer-executable commands, on a non-transitory computer-readable recording medium. As an implementation example, the computer-readable commands are executed by the processor 1010 to perform the method according to at least one aspect of the present disclosure.

The communication device 1020 may transmit or receive a signal in a wired or wireless manner.

In addition, the methods according to embodiments of the present disclosure may be realized in the form of program commands that can be executed by various types of computers. Thus, they may each be recorded on a computer-readable recording medium.

The computer-readable recording medium may include program commands, data files, data structures, and the like, independently or in combination. The program commands recorded on the computer-readable recording medium may be specially designed for the methods according to embodiments of the present disclosure. Alternatively, they may be well known to a person of ordinary skill in the field of computer software and thus may be available for use. The computer-readable recording medium may include a hardware device configured to store and execute the program commands. Examples of the computer-readable recording media may include: magnetic media, such as a hard disk and a floppy disk; optical media, such as a CD-ROM and a DVD; magneto-optical media, such as a floptical disk; a ROM; a RAM; a flash memory; and the like. Examples of the program commands may include not only machine language codes that are generated by a compiler, but also high-level language codes that are executable by a computer using an interpreter or the like.

For reference, the constituent elements according to each of embodiments of the present disclosure may be realized in the form of software or in the form of a hardware piece, such as a field programmable gate array (FPGA) or an application-specific integrated circuit (ASIC) and may each perform a specific function.

However, the "constituent elements" are meant to be limited to software or hardware. Each of the constituent elements may be configured to be stored on a storage medium that can be addressed or may be configured to be executed by one or more processors.

Therefore, examples of the constituent element include: constituent elements, such as software constituent elements, object-oriented software constituent elements, class constituent elements, and task constituent elements; processes; functions; attributes; procedures; sub-routines; program-code segments; drivers; firmware; a microcode; a circuit; data; a database; data structures; tables; arrays; and variables.

The number of the constituent elements may be increased or decreased in such a manner that they perform the same overall function.

It would be understandable to a person of ordinary skill in the art that each block illustrated in the processing flowcharts and a combination of the processing flowcharts may be performed by computer program instructions. The computer program instructions may be installed on either a general-purpose computer or a specialized computer or may be executed on a processor within a data processing apparatus capable of performing programming. The instructions, which are executed through the computer or the processor within the data processing apparatus capable of performing programming, generate means for performing the functions that are illustrated in the block (s) in the flowchart. In order to perform the functions in a specialized manner, these computer program instructions may also be executed by a general-purpose computer or a computer that can serve as a data processing apparatus capable of performing programming. Additionally, these instructions may be stored in a computer-readable memory. Therefore, with the instructions that are executed by such a computer and are stored in the computer-readable memory, it is also possible to produce a product including means for instructions that perform the functions illustrated in the block (s) in the flowchart. Since the computer program instructions are installed on a general-purpose computer or a data processing apparatus capable of performing programming, they enable a sequence of operating steps to be performed, thereby generating a computer-executable process. Thus, with the instructions executed on the computer or the data processing apparatus capable of performing programming, it is also possible to provide steps for performing the functions illustrated in the block (s) in the flowchart.

In addition, each block may represent a portion of a module, segment, or code that includes instructions for performing one or more specific logical functions. In addition, it should also be noted that, in several alternative implementation examples, the functions illustrated in the blocks may be performed in a manner that deviates from the sequence. For example, two blocks that are consecutively illustrated may also be performed substantially simultaneously and may also be occasionally performed in the reverse order according to the corresponding function.

The constituent element that is named using the term "unit" or "module" in the embodiments of the present disclosure may be realized as a hardware component (such as an FPGA or an ASIC), a software component, or a combination thereof. The constituent element named using the term "unit" or "module" performs a function. However, the constituent element named using the term "unit" or "module" is not meant to be limited to a software or hardware component. The constituent element named using the term "unit" or "module" may be configured to be stored in a storage medium that can be addressed, and may be configured to be executed by one or more processors. Therefore, the constituent elements named using the term "unit" or "module" include: constituent elements, such as software constituent elements, object-oriented software constituent elements, class constituent elements, and task constituent elements; processes, functions; attributes; procedures; sub-routines; program-code segments; drivers; firmware; a microcode; a circuit; data; a database; data structures; tables; arrays; and variables. The number of the constituent elements named using the term "unit" or "module" may be increased or decreased in such a manner that they perform the same overall function. Furthermore, the constituent elements named using the term "unit" or "module" may also be realized by one or more CPUs within a device or security multimedia card.

The preferred embodiments of the present invention have been described above, and it would be clearly understandable to a person of ordinary skill in the art that various modifications or alterations can be made to these embodiments without departing from the technical idea and scope of the present disclosure that are defined in the following claims.

What is claimed is:

1. A method of domain-adapting a pre-trained language model based on a transformer, the method comprising:
generating an encoding hidden vector sequence on the basis of an input sentence;
updating the encoding hidden vector sequence on the basis of a domain semantic chunk extracted from the input sentence;
generating a decoding hidden vector sequence on the basis of an output sentence and the updated encoding hidden vector sequence;
updating the decoding hidden vector sequence on the basis of a domain semantic chunk extracted from the output sentence; and
computing an output probability on the basis of the updated decoding hidden vector sequence.

2. The method of claim 1, wherein, in the updating of the encoding hidden vector sequence, the encoding hidden vector sequence is generated by applying token separation, embedding, and self-attention on the basis of the input sentence.

3. The method of claim 1, wherein, in the updating of the decoding hidden vector sequence, an output embedding vector is generated by applying token separation and embedding on the basis of the output sentence, and the decoding hidden vector sequence is generated using cross attention and self-attention on the basis of the output embedding vector and the updated encoding hidden vector sequence.

4. The method of claim 1, wherein, in the updating of the encoding hidden vector sequence, an input sentence semantic chunk embedding vector is generated on the basis of the domain semantic chunk extracted from the input sentence, an encoding semantic chunk vector is generated by applying self-attention to the input sentence semantic chunk embedding vector, an encoding semantic chunk position matrix is generated on the basis of a positional relationship between a token of the input sentence and the domain semantic chunk extracted from the input sentence, and the encoding hidden vector sequence is updated on the basis of the encoding semantic chunk vector and the encoding semantic chunk position matrix.

5. The method of claim 4, wherein, in the updating of the encoding hidden vector sequence, an attention-based encoding semantic chunk position matrix is generated through an attention technique by applying a value of the elementwise product of the encoding semantic chunk vector and the encoding semantic chunk position matrix, as a key of attention, and applying the encoding hidden vector sequence as a query of attention, and the encoding hidden vector sequence is updated on the basis of the attention-based encoding semantic chunk position matrix and the encoding semantic chunk matrix.

6. The method of claim 1, wherein, in the updating of the decoding hidden vector sequence, an output sentence semantic chunk embedding vector is generated on the basis of the domain semantic chunk extracted from the output sentence, a decoding semantic chunk vector is generated by applying self-attention to the output sentence semantic chunk embedding vector, a decoding semantic chunk position matrix is generated on the basis of a positional relationship between a token of the output sentence and the domain semantic chunk extracted from the output sentence, and the decoding hidden vector sequence is updated on the basis of the decoding semantic chunk vector and the decoding semantic chunk position matrix.

7. The method of claim 6, wherein, in the updating of the decoding hidden vector sequence, an attention-based decoding semantic chunk position matrix is generated through an attention technique by applying a value of the elementwise product of the decoding semantic chunk vector and the decoding semantic chunk position matrix, as a key of attention, and applying the decoding hidden vector sequence as a query of attention, and The decoding hidden vector sequence is updated on the basis of the attention-based decoding semantic chunk position matrix and the decoding semantic chunk vector.

8. A method of selecting a domain semantic chunk, the method comprising:
selecting a predetermined number of N-grams on the basis of a domain corpus;
generating embedding values of the N-grams;
computing similarities between each of the N-grams on the basis of the embedding values of the N-grams;

generating an N-gram graph on the basis of the similarities;

determining values of N-gram nodes included in the N-gram graph on the basis of the N-gram graph; and selecting a domain semantic chunk from among the N-grams on the basis of the values of the N-gram nodes.

9. The method of claim 8, wherein, in the selecting of the predetermined number of N-grams, N-grams are extracted from the domain corpus, and the predetermined number of N-grams are selected through filtering based on frequencies of the extracted N-grams.

10. The method of claim 8, wherein, in the generating of the N-gram graph, the similarities between each of the N-grams are computed using an approximate nearest neighbor (ANN) technique on the basis of the embedding values of the N-grams.

11. The method of claim 8, wherein, in the determining of the values of the N-gram nodes, the values of the N-gram nodes are determined using a PageRank algorithm on the basis of the N-gram graph.

12. An apparatus for domain-adapting a pre-trained language model, the apparatus comprising:

a semantic chunk selection module configured to select a predetermined number of N-grams on the basis of a domain corpus, to generate an N-gram graph on the basis of embedding values of the N-grams, to select a domain semantic chunk from among the N-grams on the basis of the N-gram graph, and to store the selected domain semantic chunk in a semantic chunk DB; and a domain adaptation module configured to generate an encoding hidden vector sequence on the basis of an input sentence, to extract a domain semantic chunk, found as a result of searching the semantic chunk DB, from the input sentence, to update the encoding hidden vector sequence on the basis of the domain semantic chunk extracted from the input sentence, to generate a decoding hidden vector sequence on the basis of an output sentence and the updated encoding hidden vector sequence, to extract a domain semantic chunk, found as a result of searching the semantic chunk DB, from the output sentence, to update the decoding hidden vector sequence on the basis of the domain semantic chunk extracted from the output sentence, and to compute an output probability for the output sentence on the basis of the updated decoding hidden vector sequence.

13. The apparatus of claim 12, wherein the semantic chunk selection module computes similarities between each of the N-grams on the basis of the embedding values of the N-grams and generates the N-gram graph on the basis of the similarities.

14. The apparatus of claim 12, wherein the semantic chunk selection module determines values of N-gram nodes included in the N-gram graph on the basis of the N-gram graph and selects the domain semantic chunk from among the N-grams on the values of the N-gram nodes.

15. The apparatus of claim 14, wherein the semantic chunk selection module determines the values of the N-gram nodes using a PageRank algorithm on the basis of the N-gram graph.

16. The apparatus of claim 12, wherein the domain adaptation module generates the encoding hidden vector sequence by applying token separation, embedding, and self-attention on the basis of the input sentence.

17. The apparatus of claim 12, wherein the domain adaptation module generates an output embedding vector by applying token separation and embedding on the basis of the output sentence and generates the decoding hidden vector sequence using cross attention and self-attention on the basis of the output embedding vector and the updated encoding hidden vector sequence.

18. The apparatus of claim 12, wherein the domain adaptation module generates an input sentence semantic chunk embedding vector on the basis of the domain semantic chunk extracted from the input sentence, generates an encoding semantic chunk vector by applying self-attention to the input sentence semantic chunk embedding vector, generates an encoding semantic chunk position matrix on the basis of a positional relationship between a token of the input sentence and the domain semantic chunk extracted from the input sentence, and updates the encoding hidden vector sequence on the basis of the encoding semantic chunk vector and the encoding semantic chunk position matrix.

19. The apparatus of claim 18, wherein the domain adaptation module generates an attention-based encoding semantic chunk position matrix through an attention technique by applying a value of the elementwise product of the encoding semantic chunk vector and the encoding semantic chunk position matrix, as a key of attention, and applying the encoding hidden vector sequence as a query of attention, and updates the encoding hidden vector sequence on the basis of the attention-based encoding semantic chunk position matrix and the encoding semantic chunk vector.

20. The apparatus of claim 12, wherein the domain adaptation module generates an output sentence semantic chunk embedding vector on the basis of the domain semantic chunk extracted from the output sentence, generates a decoding semantic chunk vector by applying self-attention to the output sentence semantic chunk embedding vector, generates a decoding semantic chunk position matrix on the basis of a positional relationship between a token of the output sentence and the domain semantic chunk extracted from the output sentence, and updates the decoding hidden vector sequence on the basis of the decoding semantic chunk vector and the decoding semantic chunk position matrix.

* * * * *